(12) United States Patent
Houston et al.

(10) Patent No.: US 6,178,463 B1
(45) Date of Patent: Jan. 23, 2001

(54) OBJECT-ORIENTED DATA PROCESSING SYSTEM WITH TRANSACTIONAL ADAPTER

(75) Inventors: Iain Stuart Caldwell Houston, Sherborne; Mark Brian Josephs, London, both of (GB)

(73) Assignee: International Business Machines Corporation, Armonk, NY (US)

( * ) Notice: Under 35 U.S.C. 154(b), the term of this patent shall be extended for 0 days.

(21) Appl. No.: 08/794,912

(22) Filed: Feb. 4, 1997

(30) Foreign Application Priority Data

May 1, 1996 (GB) .................................................. 9609013

(51) Int. Cl.$^7$ .................................................. G06F 9/00
(52) U.S. Cl. .......................................... 709/315; 709/101
(58) Field of Search .................................... 709/300–305, 709/1, 101–108, 200–253, 315

(56) References Cited

U.S. PATENT DOCUMENTS

| 5,241,675 | 8/1993 | Sheth et al. | 395/600 |
| 5,872,969 | * 2/1999 | Copeland et al. | 709/101 |
| 5,956,506 | * 9/1999 | Cobb et al. | 709/101 |

FOREIGN PATENT DOCUMENTS

| 0 613 083 | 8/1994 | (EP) | G06F/9/44 |
| 0 674 260 | 9/1995 | (EP) | G06F/9/46 |

OTHER PUBLICATIONS

Tanenbaum, Andrew S., "Modern Operating Systems," Prentice Hall, pp. 246–252, 1992.*
Schumann, R., et al, "Recovery–Management in the Relax Distributed Transaction Layer", Proceedings of the Eighth Symposium on Reliable Distributed Systems, Seattle, Washington, Oct. 10–12, 1989, Institute of Electrical and Electronics Engineers, pp. 21–28.
A copy of European Search Report re counterpart European Application No. EP 97 30 2787.
T and V Hadzilacos, "Transaction Synchronisation in Object Bases", J. of Computer and System sciences 43, 1991 pp 2–24.
S.K. Shrivastava et al "An overview of the Arjuna distributed programming system", IEEE Software, Jan. 1991, pp. 66–72.

* cited by examiner

Primary Examiner—Alvin E. Oberley
Assistant Examiner—St. John Courtenay, II
(74) Attorney, Agent, or Firm—Gates & Cooper (57) ABSTRACT

A transactional adapter for an object-oriented data processing system maintains a tree of transactions corresponding to messages between objects. A message is transformed into a child transaction, but only when any access restrictions are met. Until then it is held in a "pending" set which is part of the parent transaction's state definition. When a child commits, its parent maintains the access restrictions imposed by the child if the parent is recoverable and discards them otherwise.

20 Claims, 2 Drawing Sheets

OBJECT-ORIENTED DATA PROCESSING SYSTEM WITH TRANSACTIONAL ADAPTER

TECHNICAL FIELD OF THE INVENTION

The present invention relates to object-oriented data processing systems with transactional properties.

BACKGROUND OF THE INVENTION

Object-oriented (OO) computing is now a well-established computer programming technique offering high productivity and reliability to the application program developer. An "object" is a self-contained software package which combines "variables" and "operations" (also known as "methods") which operate on these variables. Variables may take data values so that an object's "state" is defined by the values of its variables at any point in time. Operations are the only way of accessing an object's variables for the purpose of reading or modifying them. In addition to having an effect on its local state, an operation can itself cause "messages" to be sent to other objects which causes invocation of further operations at recipient objects.

An object is defined via its "class" and is an "instance" of the class. A class is a software template that defines the external interface of the object by means of interface definition language (IDL) statements. The external interface is unchanging and enables the object's operations to be invoked and data to be passed to and from the object variables. The internal implementation of an object may be changed providing its external interface conforms to its class definition. Because of the continuity of the external interface, objects are readily reusable by other application programs and also may be replaced by freshly written versions without affecting an application program which invokes them.

Other important aspects of object-oriented programming such as "inheritance" (the ability to have an object subclass which inherits the methods and variables of a superclass) and "polymorphism" (the property that objects in different classes may respond to the same message) are not strictly relevant to an understanding of the present invention. A more general description of object-oriented technology may be found in "SOM objects: A Practical Introduction to SOM and DSOM" (Document No. GG24-4357-00, July 1994, IBM Corporation).

Object-oriented programming techniques have now been applied to many applications. One of the best known of these is data base management. Object-oriented data base management systems (OODBMS) are now well established in the marketplace. With any data-base management system, whether object-oriented or not, the problem of concurrency control (or serializability) is well understood. This is essentially that inconsistent changes to the data base may occur and erroneous information may be read or stored if access to the data base records for the purpose of reading or writing data is not strictly controlled and sequenced. This problem of maintaining data base integrity is normally tackled by imposing transaction processing techniques on the data base operations together with a lock management system.

Transaction processing is a long established programming technique in which a sequence of associated operations which transforms a consistent state of a recoverable resource into another consistent state forms a "transaction" (sometimes referred to as a "unit of work"). A transaction must either be "committed" on completion, in which case all changes required by operations are made permanent, or "aborted", in which case all changes actually made by the operations are rolled back (undone). In the transaction processing context, this is known as "synchronization" or "coordination". A general discussion of transaction processing can be found in "Transaction Processing: Concepts and Products" (Document No GC33-0754-00, IBM Corporation).

By applying transaction processing principles to data base access operations, integrity of the data can be assured even in a large distributed system.

Many of the concurrency considerations for applying transactional techniques to data bases are also relevant in considering object-oriented systems in general (not only OODBMS). In the same way that operations on databases are transactional, it is now recognised that operations on objects need to be transactional to conserve application data integrity and consistency.

As pointed out by T. and V. Hadzilacos in an article "Transaction Synchronisation in Object Bases" (J. of Computer and System Sciences 43, 1991 pp 2–24), concurrency control considerations in so-called object bases differ in some respects from data base concurrency control. One of the differences is that operations in a general object setting may be nested in that a user application invokes operations which may invoke other operations and so on. This is unlike the traditional data base setting where transactions issue a sequence of simple read and write actions. A second difference is that general object transactions can be implemented as quite long running programs and thus cannot efficiently be processed serially like the shorter read and write operations in data bases. It is therefore necessary to provide for multiple invocations of operations of the same object to be active simultaneously, rather than being mutually exclusive. Such simultaneous executions must be synchronised since they may share access to common variables of the object. Finally, to further assist parallelism, operations in general object systems should exhibit internal concurrency, in order that they can send messages, invoking operations on other objects simultaneously.

The article proposes a conceptual scheme for achieving this level of concurrency control by separating the task into intra-object and inter-object synchronisation and proposing a formal model for execution in an object system.

Another article "An overview of the Arjuna distributed programming system" (S. K. Shrivastava et al, IEEE Software, January 1991, pp 66–72 describes a prototype object-oriented programming system for a distributed system. The Arjuna system offers concurrency control and recovery by implementing nested atomic actions (transactions) on persistent objects. By using type inheritance, objects may control their own level of concurrency in a type-specific manner. An object becomes active when an operation is invoked on it by a transaction and remains active until the transaction commits or aborts. If the transaction is nested inside other atomic actions, the object will remain active until either the outermost transaction commits or the invoking transaction or an ancestor transaction aborts. The implementation of Arjuna defines a base class State Manager which enables the construction of persistent objects and atomic actions (transactions). This supports object activation, deactivation and recovery. A Lock Manager uses these facilities and provides concurrency control (implemented as two-phase locking) to implement what is referred to as atomic-action serializability. Transactional behaviour is not imposed by the system on all operations on objects, however, but is initiated in response to the user's class definition declaring atomic actions to control the recovery requirements of the class.

European patent application no. 0613083 A2 entitled 'Transaction Management in object oriented systems' also describes a system in which user generated client applications may impose transactional constraints on operations they start by issuing a create-transaction call to a Transaction Manager. The Transaction manager returns a transaction identifier which the client then passes to an Object Manager (server) which, in turn, indicates to the Transaction Manager that it has joined the transaction. The purpose is to allow clients to customize their own transaction requirements without requiring the operating system kernel to provide transaction management. Provision is also made for nested transactions.

Although providing for transactional behaviour in object-oriented systems, neither the above referenced European patent nor the Shrivastava article address the requirement described in the Hadzilacos article, to assure complete concurrency control of all operations in an object-oriented system. Nor do they automatically provide concurrency control for persistent objects.

Approaching from the opposite direction, there are in existence known proposals for providing established transaction processing systems with an object-oriented interface. Perhaps the best known of these is the Object Transaction Services (OTS) specification from the Object Management Group (OMG) (OMG document 94.8.4 "Object Transaction Service"). OTS exploits object-oriented programming to encapsulate the processing performed under transactional scope, allowing the programmer to designate certain operations or classes as transactional.

In OTS, the implementation of a recoverable resource must be "transaction-aware" to the point of participating in each of the events of a two-phase commit process and resource recovery. In the object world, people wish to design Common Business Objects (CBO's) as servers which, if they are to be reliable must be transactional. OTS and its implementation can only offer a transaction-aware solution, requiring too much complexity at too low a level.

Thus they do not provide a simple object framework within which applications can be designed that has sufficient power and simplicity for commercial transaction applications without requiring transaction awareness.

SUMMARY OF THE INVENTION

Thus, the prior art has not, on the one hand, provided general concurrency control of operations in object-oriented systems nor, or on the other hand, provided a simple object framework for commercial transaction applications at an abstract enough level to avoid the need for the applications to explicitly participate in transaction management tasks.

Accordingly, the present invention provides an object-oriented data processing system having transactional properties such that each message sent to any of the objects in an object-oriented application is processed as a transaction. The transactional properties provide for nested transactions whereby message initiated transactions can spawn further messages which are processed as child transactions, each transaction being allowed to commit only when all its child transactions have terminated. The system includes object management means for managing objects in such applications and the transmission of messages there between. It also includes a transactional adapter layer through which all messages sent to objects pass and which creates corresponding message-related transactions. Each message-related transaction is represented by a state definition which includes a pending set of messages which have been spawned by each transaction but for which no corresponding child transactions have yet been created by the system.

This is at the heart of a simple object-oriented framework integrating transactional and object-oriented techniques which is of use, particularly to the designers of server applications, where the greatest complexity is encountered. By imposing transactional properties on messages between objects in a particularly simple way, the framework—or object-oriented programming model— has both sufficient power and sufficient simplicity for commercial transaction applications without those applications having to explicitly participate in transaction demarcation operations.

Preferably, the system and method defines a root transaction whose pending set contains the incoming messages to the transactional layer, so that subsequently created transactions corresponding to said incoming messages are child transactions of the root transaction.

Another preferred feature of the invention is that each transaction has an identifier and its state definition further includes a path sequence containing the transaction identifiers of its ancestor transactions in sequential order, the path sequence of the root transaction being empty.

Preferably, each transaction state definition further includes a recoverability indication indicating whether or not the transaction is recoverable; a children set identifying child transactions which have not yet terminated; an exclusive set identifying objects in the OMS under the exclusive access control of said transaction or its committed recoverable children; and a shared set identifying objects in the OMS under the shared access control of this transaction or its committed recoverable children.

Preferably, concurrency control is implemented according to the invention so that a transaction requiring exclusive access to a target object cannot start while any non-ancestor transaction has shared or exclusive access to the target object, as determined by the state definitions of its non-ancestor transactions, and a transaction requiring shared access to a target object cannot start while any non-ancestor transaction has exclusive access to the target object, as determined by the state definitions of its non-ancestor transactions.

Thus, by completely defining the state of all transactions, concurrency control can be implemented without requiring a lock manager. In the preferred system, the object management means includes a transaction coordinator, said transaction layer being responsive to transaction-unaware input to objects in said object-oriented system to demarcate corresponding transactions in said transaction coordinator.

Preferably the transaction coordination is an object-oriented transaction service. It should be realised that other arrangements are possible within the scope of the invention. For example, a procedural transaction coordinator could be employed with an object-oriented transactional layer or an integrated object-oriented interface could be employed.

Preferably, the system further includes an object request broker via which all messages between objects are passed. However, other object-oriented architectures not requiring an object-request broker may also be employed.

The system also preferably provides means for detecting a set of mutually deadlocked transactions; means for selecting one of said transactions; and means for aborting said selected transaction.

BRIEF DESCRIPTION OF THE DRAWINGS

The invention will now be described, by way of example only, with reference to the accompanying drawings, in which.

DETAILED DESCRIPTION OF THE INVENTION

Figure 1:
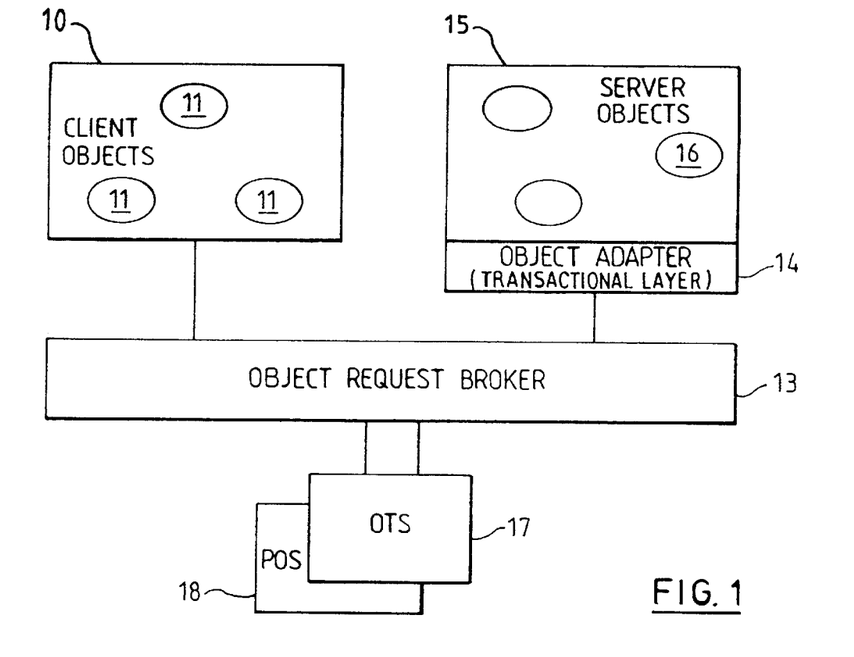
FIG. 1 is a schematic illustration of a data processing system according to the present invention.

A simple example of an object-oriented system in which the invention is implemented is illustrated in FIG. 1. An object-oriented application 10 includes a number of objects 11. The application 10 is a client to a server application 15 which itself includes objects 16. In the context of the present invention, the server 15 may be any persistent object server which may be implemented, for example, in conventional data base management systems, recoverable stream files, etc., as well as an OODBMS. The client objects 11 when invoked send messages to server objects 16 whose methods they wish in turn to invoke. These messages are not transmitted directly but are processed by an Object Request Broker 13 which in turn sends messages on to the server object 16. The Object Request Broker is of use in a distributed system and conforms to the Common Object Request Broker Architecture (CORBA) defined by the Object Management Group (OMG). Even messages between objects in the same node must pass through the ORB 13.

Between the ORB 13 and server 15 is an object adapter 14 which, according to the invention acts as a transaction layer imposing transactional properties on the messages between objects.

Also provided is a transaction coordinator 17 which implements the function of the OMG's Object Transaction Service as described in the above referenced OMG document. The OTS implementation uses the so-called demarcation operations—"begin", "commit" and "rollback" to effect the two phase synchronisation of transactions initiated by transaction layer 14 in response to invocation of server objects 16 by client objects 11 or by message spawning from other objects. Thus, the layer 14 is an interface between the transaction-unaware application 10 and OTS 17 which assumes a transaction-aware application.

Additionally, the system has a Persistent Object Service (POS) 18, as defined in the "CORBA Services" document, published by OMG in 1995, to provide "store" and "restore" operations. The restore operation is used to activate an in-storage version of an object which is the target of a transactional operation. The store operation is used to harden (write durably) the state of an object as it is committed. Together, the ORB 13, OTS 17 and POS 18 constitute an object management system.

Figure 2:
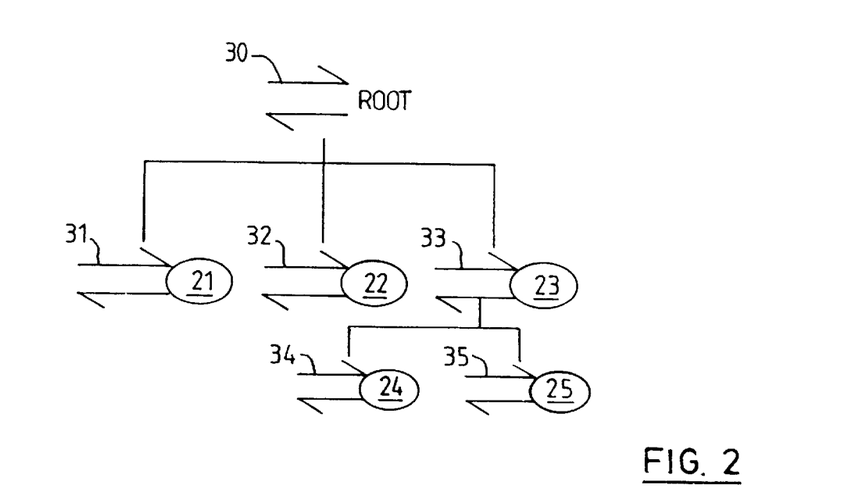
FIG. 2 shows the relationship between objects and transactions in the system of FIG. 1.

OTS 17 enables a forest of nested transaction families to be created, the root of each transaction family tree being each child of a root transaction of the transactional layer described in more detail in connection with FIG. 2 below. The forest of transactions can be created (and destroyed) by using the transaction demarcation operations of OTS, namely the "begin" and "commit" and "rollback" operations of the OTS's "Current" interface. Such a forest can be distributed over a network of computer systems that are connected by a distributed ORB (Object Request Broker) as described in the OMG's CORBA document (CORBA V2 July 1995, Object Management Group). The side effects of the begin operation of the Current interface (denoted Current::begin in both C++ and OMG IDL) are used to construct such a forest. Current::commit and Current::rollback are used to tell the OTS Coordinator to complete a transaction using two-phase commit protocols. Coordinator::register_resource and register_subtranaware operations are used to involve "Transaction" objects of the transactional layer in the transaction forest so that their "Resource" and "SubtranAwareResource" interfaces can be invoked by the OTS "Coordinator" object in the course of its two-phase commit processing.

Both the POS and OTS services are available as part of IBM's SOMObjects Version 3.0 product and are described further in a series of volumes under the general title "SOMObjects Version 3.0" and "SOMObjects Developer Toolkit" published by IBM Corporation, 1996).

It should be understood that the invention can be implemented otherwise than by means of ORB 13, OTS 17, and POS 18, which are simply the preferred implementation of an object management system. Non-object transaction managers such as IBM's CICS transaction server could be substituted for OTS. Other object-oriented architectures could be substituted for COBRA.

The facilities provided by the transaction processing system constituted by layer 14, coordinator 17 and service 18 are as follows:

Messages and transactions: Each message sent to an object is processed as a transaction when the object becomes accessible. The system can determine when an object is accessible as will be described below.

Transaction nesting: Such a transaction can spawn one or more messages that will result in child transactions executing on the same or other objects. A parent may commit only when all its children have terminated. The system maintains a tree of transactions as illustrated by the example of FIG. 2. In FIG. 2, objects are represented by ellipses and transactions by opposed arrow heads. Messages received from a user wishing to access target objects 21, 22, 23 in the object management system (server 15, FIG. 1 ) create first level transactions 31, 32, 33 which are children of a root transaction 30 defined by the system. Target object 23 spawns messages to further objects 24 and 25 in response to which the system creates corresponding nested transactions 34 and 35.

Concurrency: Transactions can run concurrently subject to the accessibility of objects. The system can choose to abort a transaction when it detects a deadlock.

Access restrictions: A transaction may require exclusive (write) access, shared (read) access or unrestricted (dirty) access to its target object. A transaction requiring exclusive access cannot start while any non-ancestor transaction has shared or exclusive access to the target object. A transaction requiring shared access cannot start while any non-ancestor transaction has exclusive access.

The purpose of these facilities is to support concurrent and shared access to managed objects, while enabling the object management system to preserve the consistency of the objects and recover from failure.

The transaction processing system layer 14 is fully specified below in the Z notation. For an understanding of this notation, the reader is referred to 'Z Guide for Beginners' by M McMorran and S Powell (Blackwell Scientific Publications, 1993). As far as possible, the Z notation of system layer 14 is amplified by corresponding explanation in natural language. However, it should be realised that the specification alone would allow a computer programmer of ordinary skill to write a complete set of programs to implement a data processing system according to the invention.

Z Specification

In the following text, Z statements are italicized.

Given Sets

We can think of the specification as being generic with respect to the following sets:

*[Obj, Msg, TId]*

All object identifiers, messages and transaction identifiers employed in the system are members of these sets.

Messages

Every message includes information about

1. Its target object.
2. Whether the transaction to which it gives rise is recoverable.
3. Whether that transaction imposes any access restrictions on its target.

This is specified in Z by means of a total function declaration of the constants employed by the members of the set Msg;

*target: Msg → Obj*
*recov: Msg → YesNo*
*access: Msg → Access*

YesNo and Access are sets whose members can assume values specified by the following datatype definitions:

*YesNo::=yes/no*

*Access::=unrestricted/shared/exclusive*

Transactions

The state of a transaction comprises the following components:

path identifies the transaction by means of the sequence of transaction identifiers leading to it through the tree of nested transactions. Thus the root transaction has an empty path. Siblings share the same path up to, but not including, the last element.

recoverable records whether or not the transaction is recoverable.

exclusive is a set which identifies objects under the exclusive access control of this transaction or its committed recoverable children.

shared is a set which identifies objects under the shared access control of this transaction or its committed recoverable children.

pending is a set which records messages that have been spawned by this transaction but for which no transaction has yet been created by the system.

children is a set which identifies child transactions which have not yet terminated.

The above transaction state is specified in Z by a state schema.

A Z Schema consists of a name, at the top, in this case 'Transaction', followed by a series of declarations above a separator line. Below the separator are one or more predicates which are logical constraints.

| Transaction |
| --- |
| *path: seq TId* |
| *recoverable: YesNo* |
| *exclusive: ⇸ Obj* |
| *shared: ⇸ Obj* |
| *pending: ⇸ Msg* |
| *children: ⇸ TId* |
| --- |
| *disjoint <exclusive, shared>* |
| *path = <> => recoverable = no ∧ exclusive = ∅ ∧ shared = ∅* |

The constraints of the Transaction schema are firstly that objects cannot be both exclusive and shared and, secondly, the root is not recoverable and does not impose access restrictions on any object.

| ΔTransaction |
| --- |
| *Transaction: Transaction'* |
| --- |
| *path' = path ∧ recoverable' = recoverable* |

The ΔTransaction schema specifies that no change to the state of a transaction ever changes its path or changes whether or not it is recoverable.

Active Transactions

A transaction is started in an active state. It can:

release objects under its control (and remain active)

spawn messages (and become inactive)

commit itself abort itself

After commit or abort, the transaction is terminated. After spawning, the transaction remains inactive until the resulting child transactions have terminated.

| Active Transaction |
| --- |
| *Transaction* |
| --- |
| *pending = ∅ ∧ children = ∅ ∧ path ≠ <>* |

The Active Transaction schema specifies that a transaction (other than the root) which has neither pending messages nor children is active. It is referred to in various operation schemas below.

Transaction processing

The transaction processing system (14 and 17, FIG. 1) can now be described by way of a further schema, the TP schema. Although not part of the schema, line numbers are used to assist in the accompanying explanation:

| TP |
| --- |
| *trans: ⇸ Transaction* |
| --- |
| *( ∀t1, t2: trans | t1 ≠ t2 • t1.path ≠ t2.path)* |
| *( ∃root: trans • root.path = <>* |
| *∧ ( ∀child: trans \ {root} •* |
| *(∃parent: trans •* |
| *front child.path = parent.path* |
| *∧ last child.path ∈ parent.children )))* |

-continued

TP ( ∀parent: trans; GId; TId | GId ∈ parent.children •
    (∃child: trans • child.path = parent.path ⁀<GId> ))
(∀t1, t2: trans •
    disjoint <t1.exclusive, t2.exclusive, t2.shared>
    ∨ t1.path ⊆ t2.path
    ∨ t2.path ⊆ t1.path)

The TP Schema line 1, specifies a set trans which is a finite subset of the set Transaction. In other words, every possible combination of permissible transactions which might occur in a real application program must obey the constraints on lines 2 to 13. Broadly, the constraints say that the transactions form a tree of nested transactions. Further, a transaction with exclusive access to an object allows only ancestors or descendants to have exclusive or shared access to that object (recall that a transaction with children is inactive).

In more detail, the constraint on line 2 (constraint 2) requires that no two transactions have the same path. Constraint 3 specifies that there is always a 'root' transaction whose path is empty. Constraints 4 to 7 specify that for every other (non-root) transaction, there is a parent transaction such that the front of the child's path sequence (the sequence consisting of all elements of path except the last) is the same as its parent's path and the last path TId (last element of path) is a child of its parent.

Constraints 8 and 9 mean that for all parents, there is a child transaction whose path is just the parent's path with the child's tId concatenated onto it.

Constraints 10 and 11 specify the concurrent access rules that if a transaction t1 has exclusive access to an object then no other transaction t2 has either exclusive or shared access to that same object. This constraint is relaxed by constraints 12 and 13 when either t3 is an ancestor of t1 or t1 is an ancestor of t2.

The Transaction Processing Lifecycle

The kind of schema required to specify the behaviour of a system is known as an "operation schema", as opposed to the state schemas introduced so far. A variable in an operation schema may be "decorated" by a "?" suffix which indicates that it is an input operation. The decorated variable is not the same as the undecorated one. Such schemas are used below to describe the transaction processing life cycle.

Initial State

Initially the transaction processing system contains only the root transaction, specified by the following state schema:

InitialTP

TP' trans' = {Transaction ' | path'=<> ∧ pending'=∅ ∧ children'=∅}

This is the formal equivalent of saying that, initially, the root transaction has no pending messages and no children.

Spawning Messages

Messages entering the system are treated as if spawned by the root transaction. In other words, the system puts incoming messages into the pending set of the root transaction. Active transactions may spawn their own messages.

The effect of message spawning in changing the system is specified by the following operation schema:

spawnMessages

ΔTP
Transacation?
spawning?: ⇒ Msg

θTransaction? ∈ trans
disjoint <spawning?, pending?>
path? ≠ <> ⇒ ActiveTransaction?
( ∃ΔTransaction | θTransaction = θTransaction? •
    trans' = (trans \ {θTransaction}) ∪ {θTransaction'}
    ∧ exclusive' = exclusive
    ∧ shared' = shared
    ∧ pending'= pending ∪ spawning?
    ∧ children' = children )

This schema requires that no message may be both pending and spawning. The system is updated by adding the spawning? set to the pending set of the spawning transaction.

In more detail, in line 1 ΔTP declares the before and after components of the state schema TP, describing the transaction processing system. Lines 2 and 3 define inputs Transaction? and Spawning? which change the system.

In line 4, θTransaction? means the current state of the input Transaction and the constraint specifies that the input transaction is one of those already known to the TP system. Constraint 5 requires that none of the newly spawning messages, is already known about. Constraint 6 says that the current transaction which is spawning the messages must be active unless it is the root transaction. Constraints 7 to 12 effectively update the state of the TP system without affecting the state of the spawning transaction except in adding the spawning? message to its pending set.

After the spawnMessages operation, an active transaction's pending set records the messages just spawned and no others:

spawnMessages ^
    ActiveTransaction?•∃Transaction'\θTransaction'∈trans'\trans•
    pending'=spawning?

Starting A New Transaction

When an object becomes accessible to a pending message, a new transaction can be started. The system can determine whether the object is accessible by reference to the exclusive and shared sets of all current transactions.

Starting a transaction results in two changes being made simultaneously to the system:

1. The transaction is added to the tree.
2. The transaction's parent is updated to record the creation of its new child.

The following operation schema defines the starting of a new transaction as a child of a presumed parent:

```
        startTransaction_θ
1   ΔTP
2   parent, parent', child': Transaction
3   msg: Msg
4   tId: TId
5   tId ∉ parent.children
6   parent ∈ trans
7   msg ∈ parent.pending
8   access msg = shared⇒
9       ( ∀t: trans * target msg ∉ t.exclusive
10          ∨ t.path ⊆ parent.path)
11  access msg = exclusive⇒
```

```
12      ( ∀t: trans * target msg ⊂ t.exclusive ∪t.shared
13          v t.path ⊆  parent.path)
14  ( ∃Transaction' | θTransaction'= child' *
15     path' = parent.path (tId)
16     pending' = ∅
17     ^children' = ∅
18     ^recoverable' = recov msg
19     ^access msg = unrestricted→
20        ( exclusive' = 0 ^shared' = ∅ )
21     ^access msg shared→
22        ( exclusive' 0 ^ shared' = {target msg} )
23     ^access msg = exclusive→
24        ( exclusive' = {target msg} ^shared' = ∅ ) )
25  ( ∃ΔTransaction | θTransaction = parent ^ θTransaction' =
parent'● *
26     pending' = pending +(msg)
27        ^children' = children ∪ (tId)
28        ^exclusive' = exclusive
29        ^shared'= shared )
30  trans' = (trans \ {parent}) ∪ (parent', child')
```

Lines 1 to 4 of the startTransaction_⊙ schema declare the update of the TP system and the items involved in starting a new transaction, namely the parent before, the parent after and the newly added child transaction. An arbitrary message, msg, and transaction identifier, tId are also declared.

Line 5 merely states that tId is not one of the (before) parent's existing children. Line 6 states that the parent (before) is one of the transactions of the TP system and line 7 that msg is one of the (before) parent's pending messages.

Lines 8–13 establish whether the target object is accessible by reference to the access requirements of other transactions in TP. Lines 8–10 state that if the message requires shared access to its target, then either no transaction already has exclusive access or, if it has, is an ancestor transaction. Lines 11–13 state similarly that if the message requires exclusive access to its target, then either no transaction already has exclusive access or else is an ancestor.

Lines 14–24 define the initial state of the newly started child transaction. Line 15 specifies the child's path as the parent's path concatenated with the child's identifier,.tId. The child has no pending messages (line 16), no child restrictions (line 17) and its recovery property is that of its generating message (line 18). Lines 19 and 20 specify that if the message has no access restrictions, the target object is not remembered in the transaction's shared or exclusive sets.

Lines 21–22 and lines 23–24 respectively, specify that if there are shared or exclusive access restrictions on the target object, they are remembered in the transaction's shared or exclusive access sets as appropriate.

Finally in lines 25–29, the parent is updated by deleting knowledge of the message from the parent's pending set (line 26). In line 27, the resulting child's tId is added to the parent's children set. There is no change to the parents exclusive or shared access sets (lines 28–29). Line 30 means that the set trans' (after) is the same as the set trans (before) less the parent (before) plus the parent' (after) and child' (after).

Transaction Committing

An active transaction can commit itself as defined by the following 'commit' operation schema:

```
        Commit
1   ΔTP
2   ActiveTransaction?
3   θActiveTransaction? ∈ trans
```

```
4    ( ∃ΔTransaction | θTransaction ∈ trans ^path = front path? *
5       trans' = (trans \ {θActiveTransaction?, θTransaction})∪
        {θTransaction'}
6         ^( recoverable = yes
7            ⇒ exclusive' = exclusive ∪ exclusive?
8              ^ shared'    = (shared ∪ shared?) +exclusive)
9         ^(recoverable  = no
10           ⇒ exclusive'  = exclusive
11             ^shared'    = shared)
12        ^pending' = pending
13        ^children' = children +{last path?})
```

The committing transaction must be active and known to the system line 3) and have a parent (line 4). The system is updated by removing the committing transaction (line 5) and updating its parent as follows:

if the parent is recoverable (line 6), then it maintains any access restrictions that the committing transaction imposed on objects. The parent maintains exclusive access in preference to shared access (lines 7 and 8).

if the parent is nonrecoverable (line 9), then the access restrictions imposed by the committing transaction are discarded (lines 10 and 11). Line 12 states that the committing child does not affect its parent's pending messages and line 13 states that a committing child is forgotten by its parent.

Transaction Aborting

An active transaction can abort itself as defined by the following operation schema:

```
        abortSelf
1   ΔTP
2   ActiveTransaction?
3   θActiveTransaction? ∈ trans
4   ( ∃ΔTransaction | θTransaction ∈ trans ^ path = front path?*
5      shared' = shared
6      ^exclusive' = exclusive
7      ^pending' = pending
8      ^children' = children +{last path?}
9      ^trans' =
    (trans \{θTransaction, θActiveTransaction})∪{θTransaction'}
```

As with transaction committing, the aborting transaction must be active, known to the system and have a parent (lines 3 and 4).

The schema primarily shows the effects on the parent of a child transaction aborting. In lines 5, 6 and 7, the parent's access restrictions are unchanged and the parent's pending set is unchanged. In line 8, the parent's children set is updated to show one child fewer by deleting the last path TID which identifies the aborting transaction. Finally, inline 9, the system is updated by removing the transaction.

Releasing accessed objects

An active transaction can release objects under its control, and so make them accessible to other transactions, as defined by the following schema:

```
        release
1   ΔTP
2   ActiveTransaction?
3   toRelease?: ℙ Obj
4   θActiveTransaction? ∈ trans
5   toRelease? ⊆ exclusive? ∪ shared?
```

-continued

```
 6      ( ∃ΔTransaction | θTransaction = θActiveTransaction? *
 7        trans' = (trans ─{θTransaction}) ∪ {θTransaction'}
 8         ̂ pending' = pending
 9         ̂ children' = children
10         ̂ exclusive' = exclusive?\ toRelease?
11         ̂ shared' = shared? ─toRelease?)
```

In the declaration portion of the release schema, a before and after state of the transaction processing system TP is declared (line 1) as is an input active transaction which is releasing access ownership of some objects. Line 3 simply declares an input set toRelease? to be part of the set of all finite subsets of the objects in the system; in other words any combination of objects may be released.

Lines 4 and 5 specify that the objects to be released should already be accessed exclusively or on a shared basis by the active transaction.

Lines 6–11 update the transaction itself (line 6) and the set of transactions (line 7) by releasing exclusively owned objects (line 10) and shared objects (line 11). The transaction's pending and children sets remain unchanged (lines 8 and 9).

Shared Accessed Objects

An active transaction can share only the objects to which it previously had exclusive access. The share schema for this operation is very like the above release schema.

```
          share
 1      ΔTP
 2      ActiveTransaction?
 3      toShare?: 𝔽 Obj
 4      θActiveTtansaction? ∈ trans
 5      toShare? ⊆ exclusive?
 6      ( ∃ΔTransaction | θTransaction = θActiveTransaction? *
 7        trans' = (trans ─{θTransaction} ∪ {θTransaction'}
 8         ̂ pending' = pending
 9         ̂ children' = children
10         ̂ exclusive' = exclusive? toShare?
11         ̂ shared' = shared? ∪ toShare? )
```

In line 5, the difference that a transaction is permitted to share only those objects that it already has under its exclusive control is specified. Line 11 redefines the shared set to include the previously exclusive set of objects.

System Aborting

Although not fundamental to the invention, provision needs to be made for the system to abort a deadlocked transaction in an attempt to free up resources.

Deadlock is defined by the following schema:

```
deadlockDetected
TP
deadlocked: Transaction
∃deadlock: 𝔽 trans | deadlocked ∈ deadlock *
( ∀dlk1: deadlock*
  ( ∃msg: dlk1.pending; u: trans; dlk2: deadlock*
     u.path ⊆ dlk2.path
   ̂ ¬ u.path ⊆ dlk1.path)
  ̂ (( access msg = shared
       target msg ∈ u.exclusive ) )
     ∨ ( access msg = exclusive
        target msg ∈ u.exclusive ∪ u.shared ) ) )
```

Where there is a set of mutually deadlocked transactions, the system will select one of these to abort so as to relieve the deadlock by any suitable method. The deadlockDetected schema means that for every deadlocked transaction dlk1 there is, somewhere in the ancestral path of another deadlocked transaction dlk2, a transaction that is blocking at least one of dlk1's pending messages. (The blocking transaction cannot be an ancestor of dlk1).

The system will abort the chosen transaction and all its descendants according to the following operation schema:

```
systemAbort
ΔTP
deadlocked: Transaction
aborted!: 𝔽 Transaction
aborted! = (Transaction | deadlocked.path ⊆ path)
trans' = trans ─aborted!
```

The deadlock is relieved according to the following simple schema:

relieveDeadlock Δ
    deadlockDetected ^ systemAbort \deadlocked

Figure 3:
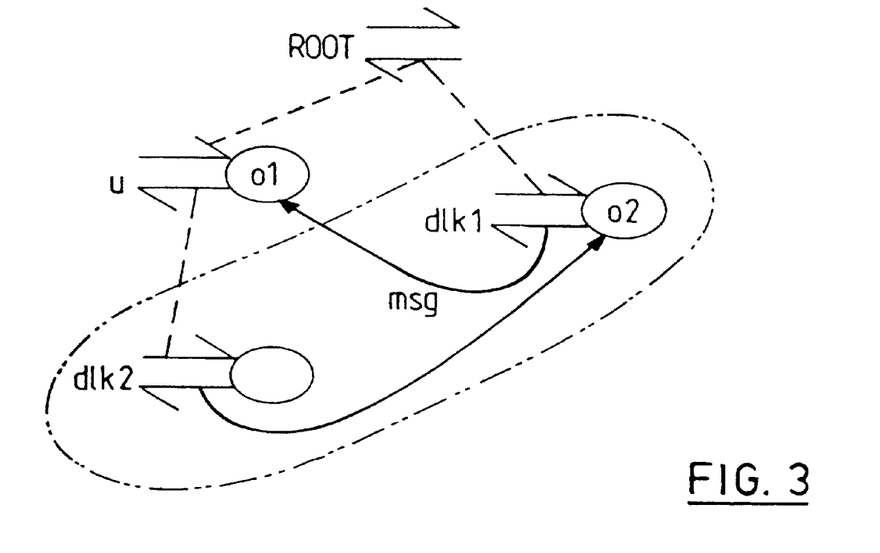
FIG. 3 illustrates a particular deadlock set in the system of FIGS. 1 and 2.
Figure 4:
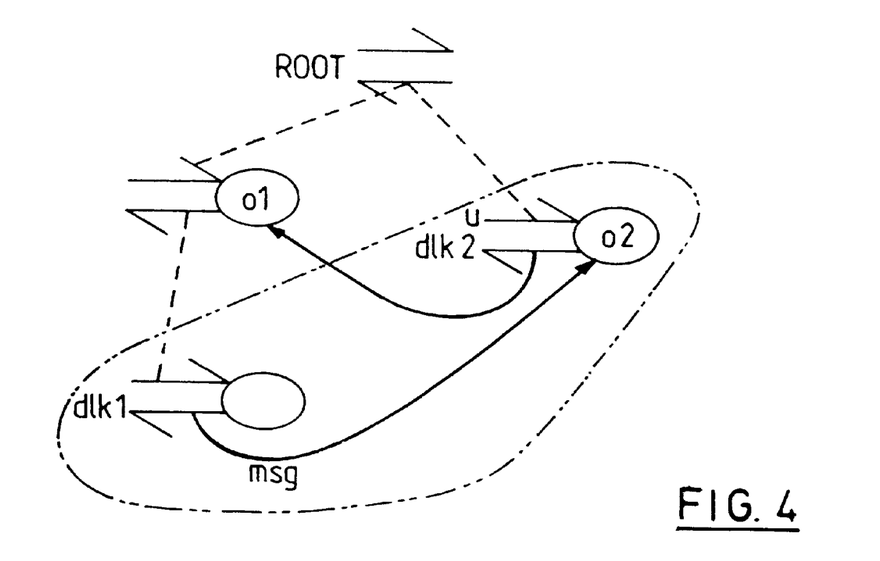
FIG. 4 illustrates a further deadlock set in the system of FIGS. 1 and 2.

FIGS. 3 and 4 illustrate two particular deadlock sets consisting of two transactions. Either transaction could be aborted.

In FIG. 3, dlk2 is a descendant of u; u has exclusive access to o1 and o1 is the target of msg. In FIG. 4, dlk2 is u itself; u has exclusive access to o2 and o2 is the target of msg.

What is claimed is:

1. A data processing system capable of executing object-oriented applications, said system comprising
    object management means for managing objects in such applications and the transmission of messages therebetween;
    and transactional adapter means through which all messages sent to objects pass for creating a transaction corresponding to each message sent to any of said objects, said created transactions including nested transactions whereby message initiated transactions can spawn further messages which are processed as child transactions, each transaction being allowed to commit only when all its child transactions have terminated, and each transaction also being represented by a state definition which includes a pending set of messages which have been spawned by each transaction but for which no corresponding child transactions have yet been created by said transactional adapter means.

2. A system as claimed in claim 1 in which the system defines a root transaction whose pending set contains the incoming messages to said transactional adapter means, so that subsequently created transactions corresponding to said incoming messages are child transactions of the root transaction.

3. A system as claimed in claim 1 in which said object management means includes a transaction coordinator, said transactional adapter means being responsive to transaction-unaware input to objects in such an object-oriented application to demarcate corresponding transactions in said transaction coordinator.

4. A system as claimed in claim 1 further including such an object-oriented application, said object-oriented application being a server application to a client application from which client application incoming messages to the server application may originate.

5. A system as claimed in claim 1 including means for detecting a set of mutually deadlocked transactions;

means for selecting one of said transactions;

and means for aborting said selected transaction.

6. A system as claimed in claim 2 in which each transaction has an identifier and its state definition further includes a path sequence containing the transaction identifiers of its ancestor transactions in sequential order, the path sequence of the root transaction being empty.

7. A system as claimed in claim 3 in which said transaction coordinator is an object-oriented transaction service.

8. A system as claimed in claim 6 in which each transaction state definition further includes a recoverability indication indicating whether or not the transaction is recoverable;

a children set identifying child transactions which have not yet terminated;

an exclusive set identifying objects in the object management system under the exclusive access control of said transaction or its committed recoverable children;

and a shared set identifying objects in the object management system under the shared access control of this transaction or its committed recoverable children.

9. A system as claimed in claim 7 in which said object management means further includes an object request broker via which all messages between objects are passed.

10. A system as claimed in claim 8 in which a transaction requiring exclusive access to a target object cannot start while any non-ancestor transaction has shared or exclusive access to the target object, as determined by the state definitions of its non-ancestor transactions, and a transaction requiring shared access to a target object cannot start while any non-ancestor transaction has exclusive access to the target object, as determined by the state definitions of its non-ancestor transactions.

11. In a data processing system, a method of object-oriented data processing comprising the steps of processing each message sent to any object as a transaction, such transactions being permitted to spawn further messages which are processed as child transactions, each transaction being allowed to commit only when all its child transactions have terminated; and creating a state definition for each transaction which includes a pending set of messages which have been spawned by each transaction but for which no corresponding child transactions have yet been created.

12. A method as claimed in claim 11 including the further step of defining a root transaction whose pending set contains incoming messages, so that subsequently created transactions corresponding to said incoming messages are child transactions of the root transaction.

13. A method as claimed in claim 12 in which each transaction has an identifier, the step of creating a state definition including creating a path sequence containing the transaction identifiers of its ancestor transactions in sequential order, the path sequence of the root transaction being empty.

14. A method as claimed in claim 13 in which the step of creating the state definition includes creating a recoverability indication, indicating whether or not the transaction is recoverable;

a children set identifying child transactions which have not yet terminated;

an exclusive set identifying objects under the exclusive access control of said transactions or its committed recoverable children;

and a shared set identifying objects under the shared access control of this transaction or its committed recoverable children.

15. A method as claimed in claim 14 including the further steps of determining from the state definitions of the non-ancestor transactions of a transaction requiring access to a target object whether any non-ancestor transaction has shared or exclusive access to said target object; and preventing said access-requiring transaction having exclusive access while any non-ancestor transaction has shared or exclusive access and preventing said access-requiring transaction having shared access while any non-ancestor transaction has exclusive access.

16. A computer program recorded on a medium and for use in an object-oriented data processing system, said program comprising means for processing each message sent to any object as a transaction, such transactions being permitted to spawn further messages which are processed as child transactions, each transaction being allowed to commit only when all its child transactions have terminated; and means for creating a state definition for each transaction which includes a pending set of messages which have been spawned by each transaction but for which no corresponding child transactions have yet been created.

17. A computer program as claimed in claim 16 including means for defining a root transaction whose pending set contains incoming messages, so that subsequently created transactions corresponding to said incoming messages are child transactions of the root transaction.

18. A computer program as claimed in claim 17 in which each transaction has an identifier, said means for creating a state definition including means for creating a path sequence containing the transaction identifiers of its ancestor transactions in sequential order, the path sequence of the root transaction being empty.

19. A computer program as claimed in claim 18 in which said means for creating a state definition includes means for creating a recoverability indication, indicating whether or not the transaction is recoverable, a children set identifying child transactions which have not yet terminated, an exclusive set identifying objects under the exclusive access control of said transactions or its committed recoverable children, and a shared set identifying objects under the shared access control of this transaction or its committed recoverable children.

20. A computer program as claimed in claim 19 further including means for determining from the state definitions of the non-ancestor transactions of a transaction requiring access to a target object whether any non-ancestor transaction has shared or exclusive access to said target object; and means for preventing said access-requiring transaction having exclusive access while any non-ancestor transaction has shared or exclusive access and preventing said access-requiring transaction having shared access while any non-ancestor transaction has exclusive access.

* * * * *